US005989691A

United States Patent [19]

Furukawa et al.

[11] Patent Number: 5,989,691

[45] Date of Patent: Nov. 23, 1999

[54] MAGNETIC ELEMENT

[75] Inventors: Shinji Furukawa; Nobuyoshi Yano, both of Kyoto, Japan

[73] Assignee: Unitika Ltd., Hyogo, Japan

[21] Appl. No.: 08/808,217

[22] Filed: Feb. 28, 1997

[30] Foreign Application Priority Data

Feb. 28, 1996 [JP] Japan .................................... 8-040954

[51] Int. Cl.[6] ........................................................ B32B 7/02

[52] U.S. Cl. .......................... 428/213; 428/216; 428/221; 428/336; 428/337; 428/339; 428/357; 428/692; 428/900; 340/551; 340/572; 204/192.2; 324/252; 338/32 R; 283/82

[58] Field of Search .............................. 428/98, 213, 216, 428/221, 336, 337, 339, 357, 692, 900; 340/551, 572; 204/192.2; 324/252; 338/32 R; 283/82

[56] References Cited

U.S. PATENT DOCUMENTS

| | | | |
|---|---|---|---|
| 4,660,025 | 4/1987 | Humphrey | 340/572 |
| 4,686,516 | 8/1987 | Humphrey | 340/572 |
| 4,749,591 | 6/1988 | Ronchi | 427/79 |
| 4,797,658 | 1/1989 | Humphrey | 340/551 |
| 4,832,983 | 5/1989 | Nagatomi et al. | 427/81 |
| 4,940,966 | 7/1990 | Pettigrew et al. | 340/551 |
| 4,967,185 | 10/1990 | Monteau | 340/572 |
| 4,980,670 | 12/1990 | Humphrey et al. | 340/551 |
| 5,181,020 | 1/1993 | Furukawa et al. | 340/551 |
| 5,313,192 | 5/1994 | Ho et al. | 340/551 |
| 5,401,584 | 3/1995 | Minasy et al. | 428/611 |
| 5,580,664 | 12/1996 | Tsai | 428/457 |

FOREIGN PATENT DOCUMENTS

| | | |
|---|---|---|
| A10448114 | 9/1991 | European Pat. Off. . |
| A13346645 | 7/1985 | Germany . |
| WO9108577 | 6/1991 | WIPO . |
| 9207343 | 4/1992 | WIPO . |

OTHER PUBLICATIONS

"Barkhausen Transition in Single Layer and Bilayer Thin Permalloy Films," *Journal of Applied Physics*, vol. 75, No. 10, Part 02B, May 15, 1994, pp. 6997–6999.

*Primary Examiner*—Stevan A. Resan
*Attorney, Agent, or Firm*—Sughrue, Mion, Zinn, Macpeak & Seas, PLLC

[57] ABSTRACT

A magnetic element comprising a thin film having a uniaxial magnetic anisotropy partly disposed on a polymer substrate. The magnetic element exhibits a discontinuous magnetic reversal under an applied magnetic field having a magnitude that is not smaller than a predetermined value. Despite its simple structure, the magnetic element exhibits excellent magnetic characteristics. Furthermore, the magnetic element exhibits little variation in magnetic characteristics and its magnetic characteristics are therefore high reproducible.

25 Claims, 4 Drawing Sheets

MAGNETIC ELEMENT

BACKGROUND OF THE INVENTION

1. Field of the Invention

The present invention relates to a magnetic element which exhibits a rapid change in magnetization with a change in an externally applied magnetic filed.

2. Description of the Related Art

There are many devices which utilize the magnetization behavior of a magnetic material. In addition to devices which exhibit a continuous response to a change in an external magnetic field such as a magnetic induction type magnetic head, magnetic materials which exhibit a rapid magnetic reversal and a discontinuous response when the intensity of the applied magnetic field exceeds a predetermined value have recently been employed. When a pickup coil is disposed in the vicinity of such a magnetic material, a steep voltage pulse can be produced in the coil upon a discontinuous magnetic reversal of the magnetic material. The use of such a magnetic element can provide a simplified apparatus which is widely applicable to the measurement of magnetic fields such as the earth's magnetic field, rotational speed, flow rate, etc.

Furthermore, in recent years, electronic article surveillance systems or identification systems for preventing the theft of merchandises or for rapidly processing the flow of materials have become more widely used. These devices employ identifying markers such as a transmitting circuit, an LC resonance circuit, a magnetostrictive vibrating material and a high magnetic permeability material, as well as the above-described magnetic material which exhibits a discontinuous magnetic reversal. For example, U.S. Pat. Nos. 4,660,025, 4,686,516 and 4,797,658 disclose a system employing a marker made of a fine amorphous Fe based alloy wire. The magnetization of the foregoing fine metal wire material is extremely stable in the longitudinal direction and thus exhibits a very sudden 180° magnetic reversal when the magnetic field reaches a predetermined magnitude. This characteristic is often called a large Barkhausen discontinuity. When the intensity of an alternating magnetic field which has been transmitted as an inquiry signal in a monitor zone reaches a critical value, the fine metal wire exhibits a discontinuous magnetic reversal, thereby causing a detection coil to produce a steep pulse voltage. The waveform of the pulse voltage thus produced is then subjected to a frequency analysis in which the intensity and proportion of high harmonics are determined to identify the marker or to judge if it is necessary to sound an alarm. This system is advantageous in that the marker is inexpensive and provides an identifying capacity higher than that of other systems.

Magnetic materials have been found which exhibit a discontinuous magnetization response besides the foregoing fine amorphous metal wire. For example, U.S. Pat. Nos. 4,980,670 and 5,313,192 disclose a material obtained by annealing a slender amorphous metal ribbon in a magnetic field. Furthermore, U.S. Pat. No. 5,181,020 discloses a thin film having a strong uniaxial magnetic anisotropy formed on a polymer substrate such as a plastic film which exhibits a discontinuous magnetic reversal. This material exhibits excellent rectangular hysteresis characteristics similar to the fine metal wire.

In order to practically use a thin film having a strong uniaxial magnetic anisotropy formed on a plastic polymer substrate as a magnetic element (e.g., as a sensor and marker), the thin film must be cut into a desired shape together with the substrate. However, when the laminate is mechanically cut by a cutter, scissors or the like, unnecessary stress is applied to the thin film even if a relatively sharp blade is used. This stress occasionally disturbs the uniaxial magnetic anisotropy of the thin film. Accordingly, the resulting magnetic element is disadvantageous in that its magnetic characteristics can vary widely.

SUMMARY OF THE INVENTION

It is therefore an object of the present invention to provide a magnetic element having good magnetic characteristics and little variation in magnetic characteristics even when it is mechanically cut by a cutter, scissors or the like.

The present invention solves the foregoing problem of the conventional art. That is, in a first embodiment, the present invention achieves the above objectives by providing a magnetic element comprising a polymer substrate and a thin film having an uniaxial magnetic anisotropy which is partly disposed on the substrate, wherein the magnetic element exhibits a discontinuous magnetic reversal under an applied magnetic field having a magnitude that is not smaller than a predetermined value.

In the second embodiment, the present invention provides a magnetic element comprising a polymer substrate having thereon a coating which is coated on the substrate in a frame-shaped pattern and a thin film having an uniaxial magnetic anisotropy disposed on said coated substrate, wherein the magnetic element exhibits a discontinuous magnetic reversal under an applied magnetic field having a magnitude that is not smaller than a predetermined value.

Despite its simple structure, the magnetic element of the present invention exhibits excellent magnetic characteristics. Further, the magnetic element of the present invention exhibits little variation in magnetic characteristics and its magnetic characteristics are therefore highly reproducible. Accordingly, the magnetic element of the present invention is of great industrial significance.

DESCRIPTION OF REFERENCE NUMERALS

1 . . . Magnetic element

2 . . . Thin film

3 . . . Polymer substrate

DETAILED DESCRIPTION OF THE INVENTION

Figure 1:
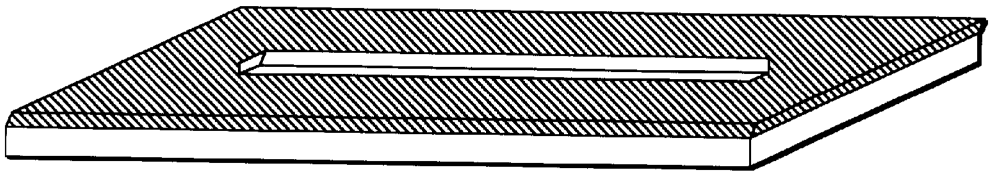
FIG. 1 is a diagram illustrating a print pattern of a water-soluble ink applied to the substrate in Example 1.

The present invention is described in greater detail below and in reference to the accompanying drawings.

The magnetic element of the present invention comprises a thin film having an uniaxial magnetic anisotropy which is partly accumulated on a polymer substrate.

As discussed above, in order to use a thin film formed on a polymer substrate as a magnetic element, the thin film must be cut into a desired shape together with the substrate. This operation imparts a cutting stress to the magnetic element.

The magnetic element of the present invention comprises a portion which does not have the thin film disposed thereon, that is, a so-called cutting margin. Namely, the thin film is absent from a part of the underlying substrate. In this arrangement, the thin film is not affected by excess cutting stress. Thus, the discontinuous magnetization characteristics, particularly large Barkhausen characteristics, of the magnetic element can be stabilized. This provides a remarkable improvement in uniformity of the magnetic characteristics.

The magnetic element of the present invention is preferably configured such that the thin film is not present within a range of 0.5 mm or more from an edge of the substrate. That is, this range serves as a cutting margin on which the thin film is not present, to thereby improve the magnetic characteristics of the magnetic element.

Furthermore, as described above, in the magnetic element of the present invention, the thin film disposed on the substrate has an uniaxial magnetic anisotropy. If the thin film does not have an uniaxial magnetic anisotropy, the resulting magnetic element undergoes a continuous magnetic reversal. Such a magnetic element does not exhibit a discontinuous magnetic reversal even under an applied magnetic field having a magnitude exceeding a predetermined value.

Specific examples of the alloy composition of thin film of the magnetic element of the present invention include crystalline materials such as NiFe, FeAlSi, FeAl and FeSi, material having extremely fine crystalline grains of Fe or Co alloys including at least one of B, C, N, O, etc., and amorphous materials such as alloys of Fe, Co or Ni including at least one of P, B, C, Zr, Nb, Si, Ti, Ta and Hf.

The thickness of the magnetic thin film is in the range of 0.1 to 10 $\mu$m, preferably 0.2 to 5 $\mu$m in the present invention. If the thickness is less than 0.1 $\mu$m, the signal intensity emitted from the magnetic thin film when the magnetization is changed is too small. On the other hand, if the thickness is more than 10 $\mu$m, it is difficult to produce a small magnetic element, because the magnetic element must have a long-shape to get an extreme change.

On the other hand, the polymer substrate for use in the present invention is not particularly limited. For example, a polyethylene terephthalate (PET) film, a polyethylene naphthalate (PEN) film, a polyarylate (PAR) film, a polycarbonate (PC) film, a nylon film, a polypropylene (PP) film, a polyimid film, a polyether sulfone (PES) or the like is used in the present invention. In those films, a polyethylene terephthalate (PET) film is preferred.

In addition, in a case of using a rollcoater which forms the polymer substrate by continuously rolling-up the film from a roll, it is preferable that the thickness of the substrate is from 10 to 300 $\mu$m, more preferably, 20 to 200 $\mu$m. If the thickness is more than 300 $\mu$m, it may be difficult to roll-up the film because of the solidity thereof. On the other hand, if the thickness is less than 10 $\mu$m, the substrate may be largely warped due to the stress of the thin film formed thereon and/or be difficult to roll-up.

One method for providing a magnetic element of the present invention in which the thin film having an uniaxial magnetic anisotropy is absent from a part of the substrate is to remove the thin film with a laser or the like while leaving the underlying substrate intact. Also, this structure can be formed by masking the substrate with a baffle to prevent the thin film from accumulating on the cutting margin.

As used in the field of metallized film capacitor, an oil margin method may also be employed to partly apply an oil to a substrate before magnetic film formation. Such an oil margin method is disclosed in U.S. Pat. Nos. 4,749,591 and 4,832,983.

Furthermore, a lift-off method may also be used in which a coating is previously printed in a negative pattern before film formation, a thin film is formed on the negative pattern, and then the coating is washed away to pattern the thin film. In particular, when a complicated shape is desired or there is a desire to reduce the production cost, a lift-off method is preferable.

The magnetic element of the present invention can then be prepared by cutting the polymer substrate on which a thin film has been partly disposed, while leaving a cutting margin around the thin film.

The magnetic element according to the second embodiment of the present invention comprises a polymer substrate having thereon a coating which is coated on the substrate in a frame-shaped pattern. Furthermore, a thin film having an uniaxial magnetic anisotropy is disposed on the coated substrate. Thus, part of the thin film is disposed on the coating and part of the thin film is directly disposed on the substrate.

The thin film disposed on the coating that is applied to the polymer substrate is vertically separated from the thin film that is directly disposed on the substrate by the thickness of the coating. Therefore, when the coating layer is sufficiently thick as compared to the thin magnetic film, excess stress does not reach or effect the thin film that is directly disposed on the substrate even if the laminate is cut in the pattern of magnetic element by a pair of scissors or the like. Thus, the discontinuous magnetization characteristics, particularly large Barkhausen characteristics, of the magnetic element can be stabilized, thereby providing a remarkable improvement in uniformity of the magnetic characteristics. Incidentally, it is preferable that the thickness of the coating layer is from 1 to 30 $\mu$m, more preferably, from 3 to 20 $\mu$m. If the thickness is thinner than 1 $\mu$m, the influence of an unnecessary stress may be given to the element when the coating layer portion is cut, so that the magnetic characteristic thereof is easily degradated. On the other hand, in case of forming the film by the rollcoater, the thickness is preferably not to exceed 30 $\mu$m, because large irregularities of the coating layer are made when the substrate is rolled-up after forming the film, thereby degradating the magnetic characteristic thereof. However, if the magnetic thin film is formed by a batch method in which the film is not rolled up, this limitation of the thickness is not applicable.

If the difference in coercive force between the thin film disposed on the coating and the thin film directly disposed on the substrate is small, the resulting magnetic characteristics are intermingled and tend to deviate far from the magnetic characteristics of the thin film that is directly disposed on the substrate. However, when the coercive force of the thin film disposed on the coating is sufficiently large, the resulting magnetic element is expected to function in a manner similar to the magnetic element where there is only a thin film that is directly disposed on the substrate, further provided that the magnetic element is operated in a magnetic field having a magnitude that is relatively small as compared to the coercive force of the thin film disposed on the coating.

Accordingly, the thin film disposed on the coating in the magnetic element of the present invention preferably has a coercive force of greater than 10 Oe so that the magnetic element can operate under an applied magnetic field of up to several oersteds.

When the thin film is disposed on the substrate, the coercive force of the thin film is preferably less than 3 Oe, more preferably, less than 1 Oe. If the coercive force exceeds 3 Oe, the signal emitted from it is not distinguishable from the signal emitted from another magnetic material. On the other hand, when the thin film is directly disposed on the coating, the coercive force is preferably more than 5 Oe, more preferably, more than 10 Oe. If the coercive force is less than 5 Oe, the difference between the coercive forces of the thin film directly disposed on the substrate and the thin film disposed on the coating is so small that the magnetic characteristics of both thin films are combined when operating the magnetic element.

The present inventors determined that the coercive force of the thin film disposed on the coating very much depends on the constituent components of the coating. For example, incorporating a pigment or an inorganic material powder called a filler into the coating can increase the coercive force of the thin film disposed on the coating.

The present inventors also determined that if a pigment is incorporated into the coating in a large amount, the density of residual magnetic flux density in the thin film disposed on the coating is reduced. If residual magnetic flux density is large, the thin film disposed on the coating functions as a permanent magnet when it is magnetized. Accordingly, the thin film disposed on the coating gives an unnecessary magnetic field to the thin film directly disposed on the substrate. Consequently, the characteristic as the magnetic thin film may be broken. On the other hand, the residual magnetic flux density of the thin film disposed on the coating containing much pigment is so small that such a magnetic field is small and it does not give an influence to the characteristic of the magnetic element.

In the present invention, the use of a coating containing a pigment such as calcium carbonate and silicon dioxide is preferable because the thickness of the coating is thereby increased in addition to providing the foregoing advantages relating to the magnetic properties of the thin film. Incidentally, it is preferable that the coating includes the pigment or filler from 40 to 90 weight % in a dried coating, more preferably, from 60 to 85 weight %. If it is less than 40 weight %, the coercive force of the thin film on the coating is not made sufficiently increased. If it is more than 90 weight %, the coating becomes cracked and/or is difficult to be coated due to high viscosity.

With regard to the coating for use in the present invention, an aqueous coating is preferred over an oil coating. This is because the thin film disposed on the coating does not adhere well to an oil coating. As a result, the thin film tends to peel off of the oil coating over time. Generally, the coating contains filler, resin, solvent and the like. For example, as the filler, there is $CaCO_3$, $BaSO_4$, $SiO_2$, $TiO_2$, Carbon, Al, iron oxide or the like. As the resin, an example is cellulose, acrylic resin, polyester, urethane, starch, vinyl chloride, vinyl acetate, polyvinyl alcohol or the like. As the solvent, an example is toluene, hexane, ethyl acetate, MEK, propanol, ethylene glycol mono-butylether or the like.

The magnetic element according to the second embodiment of the present invention can be obtained by a process which comprises disposing a thin film having an uniaxial magnetic anisotropy on the entire surface of a polymer substrate on which a coating has been previously coated in a frame-shaped pattern, and then cutting the laminate in such manner that a coated area having a thin film is left in a frame-shaped pattern formed around the thin film directly disposed on the substrate. With respect to the dimension of the frame-shaped coated area, the length of the outer short side and the outer long side are preferably from 2 to 30 mm and from 20 to 100 mm, respectively, and the length of the inner short side and the inner long side are preferably from 1 to 29 mm and from 19 to 99 mm, respectively.

EXAMPLES

The present invention will be further described in the following Examples and comparative Examples, however, the present invention should not be construed as being limited thereto.

Example 1

A water-soluble ink containing spherical $SiO_2$ and calcium carbonate pigment particles as filler (available from Osaka Printing Ink Mfg. Co., Ltd.) was screen-printed onto a polyethylene terephthalate (PET) film (thickness: 125 $\mu$m) to a thickness of 17 $\mu$m in a frame-shaped pattern as shown in FIG. 1 (outer short side: 11 mm; outer long side: 60 mm; inner short side: 1 mm; inner long side: 50 mm). The water-soluble ink includes 40 weight % of $SiO_2$ and calcium carbonate as a filler, 20 weight % of cellulose as a resin and 40 weight % of ethylene glycol mono-butylether as a solvent.

Subsequently, using a DC magnetron sputtering apparatus as disclosed in U.S. Pat. No. 5,181,020, a thin amorphous film having the composition $Co_{51}Fe_{26}Si_{10}B_{13}$ (given atm-%) was sputtered onto the screen-printed PET film to a thickness of 0.5 $\mu$m.

Figure 2:
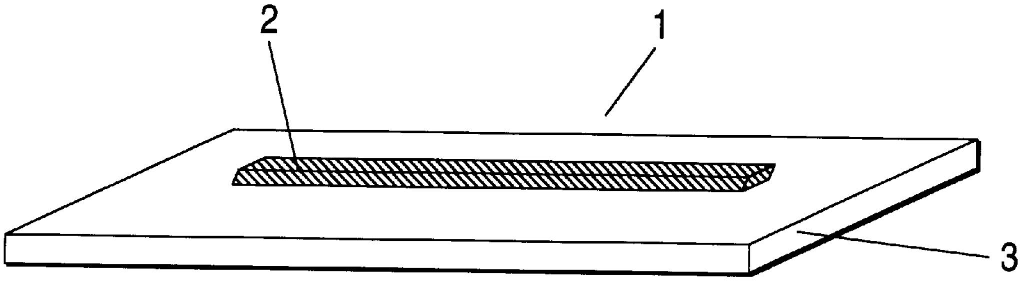
FIG. 2 is a schematic diagram of the magnetic element of the present invention prepared in Example 1.

That portion of the film which was formed over the ink and the underlying ink were removed by washing with water to obtain a slender thin film having a width of 1 mm, a length of 50 mm and a thickness of 0.5 $\mu$m. The PET film having a thin film disposed thereon was then cut into a rectangular shape such that a 3 mm wide cutting margin was formed around the thin film to prepare a magnetic element 1 of the present invention as shown in FIG. 2.

The magnetic characteristics of the magnetic element thus prepared were then measured by means of an a.c. B-H tracer (AC, BH-100K, available from Riken Denshi Co., Ltd.) at 60 Hz. The results are set forth in FIGS. 3 and 4.

Figure 4:
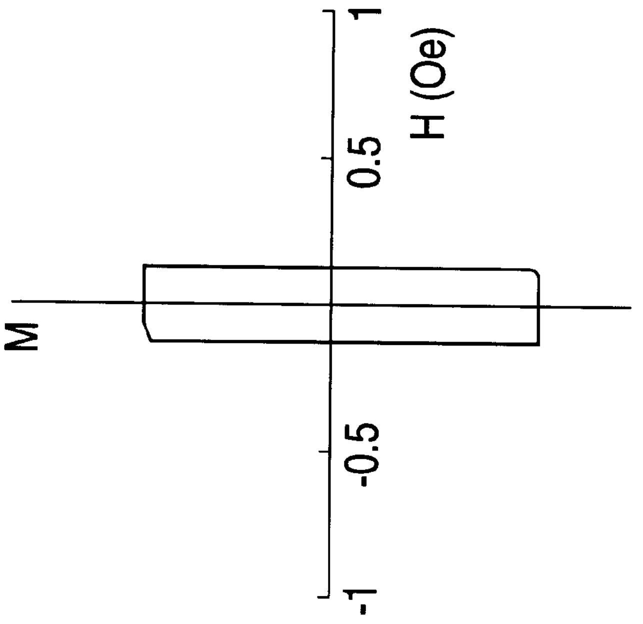
FIGS. 3 and 4 each shows a B-H loop of the magnetic element prepared in Example 1.
Figure 3:
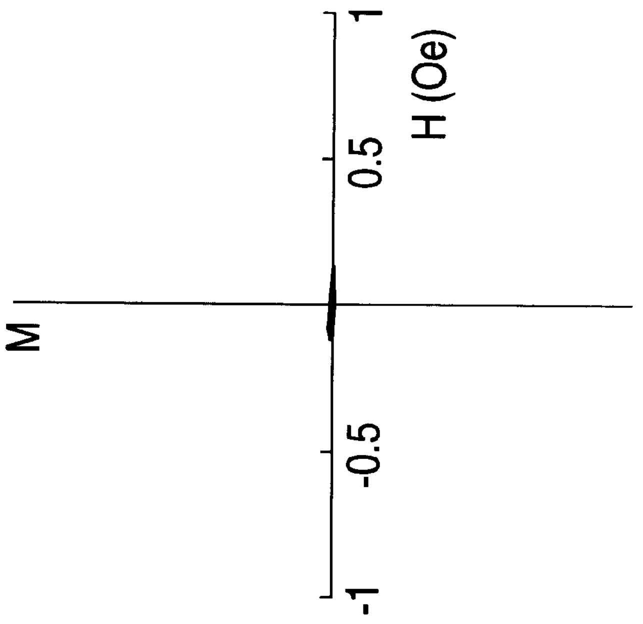

FIG. 3 illustrates the B-H loop of the magnetic element determined when the magnitude of the applied magnetic field was slightly smaller than the critical value of the magnetic field. FIG. 4 illustrates the B-H loop of the magnetic element when the magnitude of the applied magnetic field was slightly greater than the critical value of the magnetic field.

As shown in these figures, no minor loops are apparent. Thus a distinct and large Barkhausen reversal providing a sudden magnetization jump at about 0.2 Oe was achieved. Furthermore, 80% or more of the samples thus prepared produced such results. Thus, the technique in accordance with the present invention is highly reproducible.

The sputtering method used in this Example 1 employs a magnetron sputtering device, in which magnetic flux from a magnet disposed below a target is introduced to a space above the target by a yoke.

Incidentally, U.S. Pat. No. 5,181,020 discloses how prepare a thin film having a uniaxial magnetic anisotropy.

Further, in addition to the sputtering technique, evaporation, ion-plating, electro-plating and electroless-plating methods can be used for depositing the thin film onto a substrate.

Comparative Example 1

Using the same apparatus as in Example 1, the same amorphous thin film as prepared in Example 1 was formed on the same substrate as used in Example 1, except that the substrate was not coated with a water-soluble ink or other coating. Thus, the thin amorphous film was disposed directly on the entire surface of the substrate.

Figure 5:
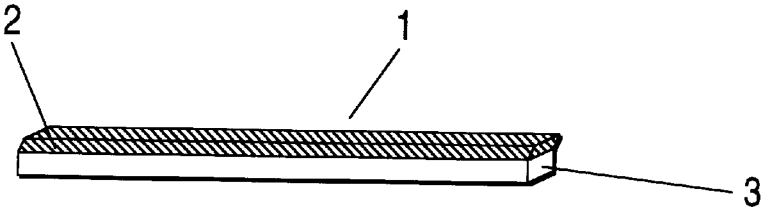
FIG. 5 is a schematic diagram illustrating the magnetic element prepared in Comparative Example 1.

The PET film having an amorphous thin film disposed thereon was then cut into a size of 1 mm wide and 50 mm long by a commercially available pair of scissors to prepare a magnetic element comprising an amorphous thin film disposed on the entire surface of the substrate in a thickness of 0.5 μm as shown in FIG. 5.

The magnetic characteristic of the magnetic element thus prepared were then measured for magnetic characteristics in the same manner as in Example 1. The results are set forth in FIGS. 6 and 7.

Figure 7:
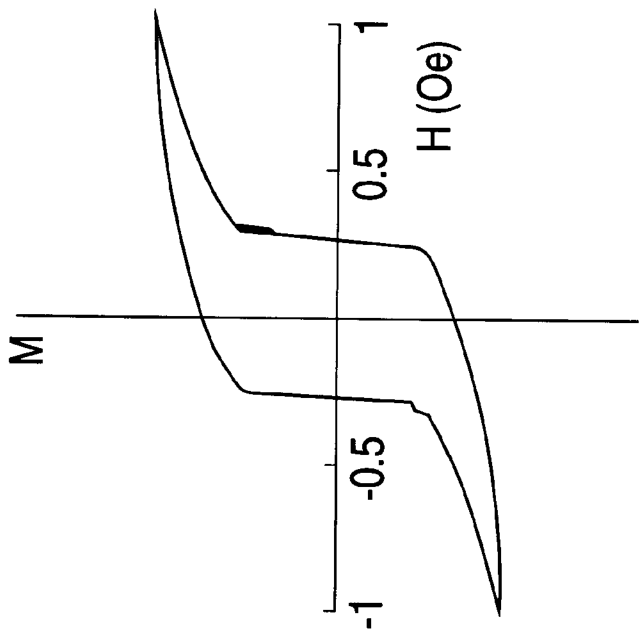
FIGS. 6 and 7 each shows a B-H loop of the magnetic element prepared in Comparative Example 1.
Figure 6:
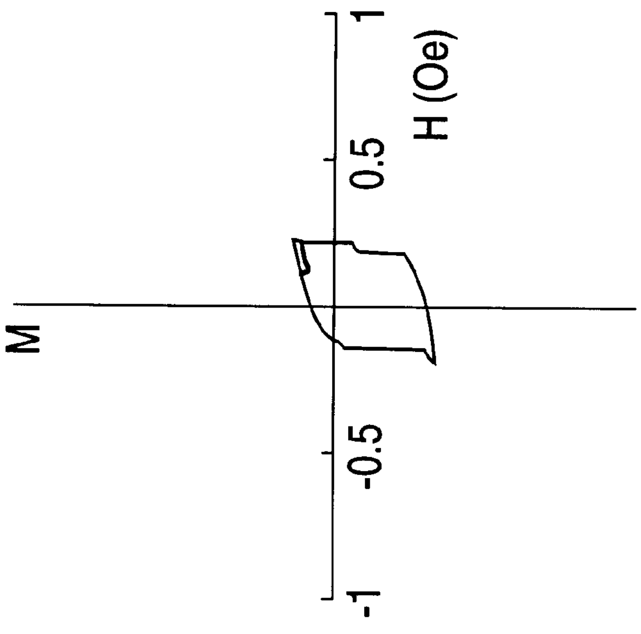

As shown in FIG. 6, this magnetic element began magnetic reversal and exhibited a minor loop even when the applied magnetic field was relatively small. As shown in FIG. 7, this magnetic element exhibited an undesirable loop squareness under conditions of a larger applied magnetic field.

The samples thus obtained by cutting the laminate varied widely in the magnetic characteristics thereof. As shown in FIG. 6, magnetic reversal was apparent even when a small magnetic field was applied thereto. Those exhibiting a stepwise loop as shown in FIG. 7 accounted for about 80% of the samples of Comparative Example 1. Thus, unlike Example 1, the magnetic element prepared in Comparative Example 1 failed to provide a large and distinct Barkhausen reversal.

Example 2

A thin film was formed in the same manner as in Example 1. The laminate was then cut such that an ink area having a thin film thereon remained in a 3 mm wide frame-shaped pattern around the thin film directly disposed on the PET film except that the ink was not removed by washing with water. Thus, a magnetic element of the present invention was prepared.

The magnetic characteristics of the magnetic element thus prepared were then measured. The results are set forth in FIGS. 8 and 9.

Figure 8:
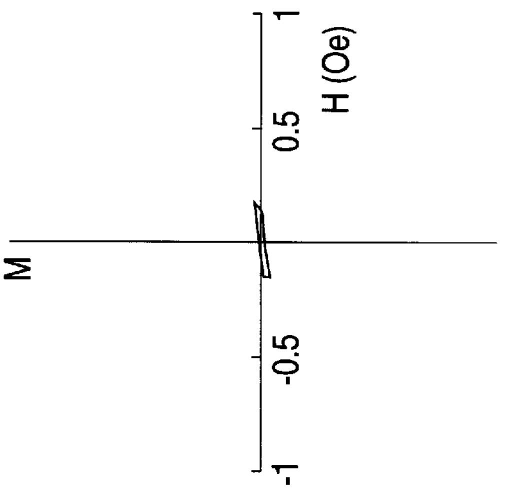
FIGS. 8 and 9 each shows a B-H loop of the magnetic element prepared in Example 2.
Figure 9:
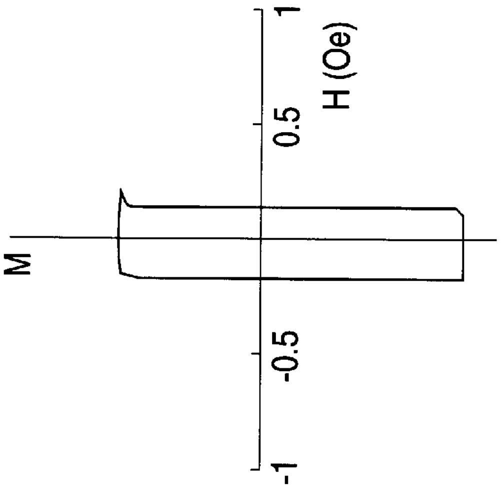

FIG. 8 illustrates the B-H loop of this magnetic element when the magnitude of the applied magnetic field was slightly smaller than the critical value of the magnetic field. FIG. 9 illustrates the B-H loop of this magnetic element when the magnitude of the applied magnetic field applied was slightly greater than the critical value of the magnetic field.

Namely, when measured under the application of a small magnetic field, the magnetic element of Example 2 produced results which differ little from those of the magnetic element obtained by a process involving the removal of an ink as shown in FIG. 3. Thus, the magnetic element of Example 2 exhibited good magnetic characteristics including a sudden jump in magnetization.

Figure 10:
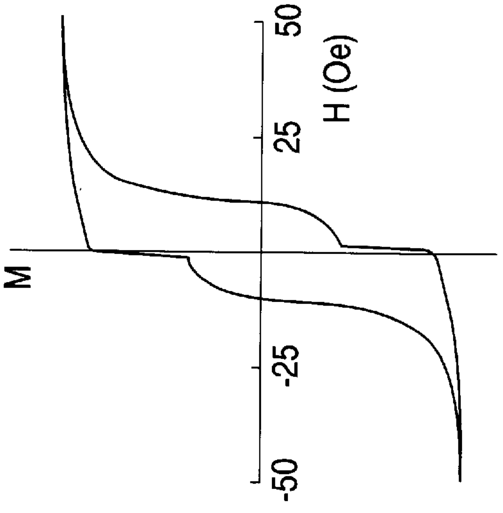
FIG. 10 shows a B-H loop of the magnetic element of Example 2 where a greater magnetic field is applied to the magnetic element.

FIG. 10 illustrates the B-H loop of this sample as determined under the application of a greater magnetic field. The stepwise loop shows that this magnetic element had a portion having a coercive force of not less than 10 Oe. This is attributed to the characteristics of the thin CoFeSiB film disposed on the ink.

Thus, the coercive force of the thin film disposed on the ink was from 10 to 100 times that of the thin film directly disposed on the PET film. Furthermore, these thin films were separated from each other by an ink film having a thickness (17 μm) far greater than that of the thin film (0.5 μm). Accordingly, the thin film directly disposed on the PET film was hardly affected by the thin film disposed on the ink.

The sample was cut at the ink area. Thus, the thin film directly disposed on PET film was not subjected to any unnecessary stress. Accordingly, distinct large Barkhausen characteristics were obtained without removing the ink and the thin film disposed thereon by washing with water. The reproducibility of the large Barkhausen characteristics was comparable to that of Example 1.

It should further be apparent to those skilled in the art that various changes in form and detail of the invention as shown and described above may be made. It is intended that such changes be included within the spirit and scope of the claims appended hereto.

What is claimed is:

1. A magnetic element comprising a polymer substrate and a magnetic thin film having an uniaxial magnetic anistropy which is partly disposed on the substrate so that a portion of the substrate, 0.5 mm or less from an edge, is not covered with the magnetic thin film, wherein the magnetic element exhibits a discontinuous magnetic reversal under an applied magnetic field having a magnitude that is not smaller than a critical value and has at least one cut edge wherein the magnetic thin film is not present within 0.5 mm from the cut edge.

2. The magnetic element of claim 1, wherein said substrate comprises polyethylene terephthalete.

3. The magnetic element of claim 1, wherein the magnetic thin film comprises one of (i) a crystalline alloy selected from NiFe, FeAlSi, FeAl, FeSi and alloys of Fe or Co including at least one of B, C, N and O, and (ii) an amorphous alloy selected from alloys of Fe, Co or Ni including at least one of P, B, C, Zr, Nb, Si, Ti, Ta and Hf.

4. The magnetic element of claim 1, wherein a thickness of said magnetic thin film is in the range of 0.1 to 10 μm.

5. The magnetic element of claim 4, wherein the thickness of said magnetic thin film is in the range of 0.2 to 5 μm.

6. The magnetic element of claim 1, wherein a thickness of said polymer substrate is in the range of 10 to 300 μm.

7. The magnetic element of claim 6, wherein the thickness of said polymer substrate is in the range of 20 to 200 μm.

8. The magnetic element of claim 1, wherein said polymer substrate comprises at least one of a polyethylene terephthalate (PET) film, a polyethylene naphthalate (PEN) film, a polyarylate (PAR) film, a polycarbonate (PC) film, a nylon film, a polypropylene (PP) film, a polyimid film, a polyether sulfone (PES) or the like is used in the present invention. In those films, a polyethylene terephthalate (PET) film is preferred.

9. A magnetic element comprising a polymer substrate having thereon a coating which is coated on the substrate in a frame-shaped pattern and a magnetic thin film having an uniaxial magnetic anisotropy partially disposed on said coated substrate so that a portion of the substrate, 0.5 mm or less from an edge, is not covered with the magnetic thin film, wherein the magnetic element exhibits a discontinuous magnetic reversal under an applied magnetic field having a magnitude that is not smaller than a critical value and has at least one cut edge wherein the magnetic thin film is not present within 0.5 mm from the cut edge.

10. The magnetic element of claim 9, wherein said polymer substrate is selected from the group consisting of a polyethylene terephthalate (PET) film, a polyethylene naphthalate (PEN) film, a polyarylate (PAR) film, a polycarbonate (PC) film, a nylon film, a polypropylene (PP) film, a polyimid film, a polyether sulfone (PES).

11. The magnetic element of claim 9, wherein said substrate comprises polyethylene terephthalate.

12. The magnetic element of claim 9, wherein a thickness of said magnetic thin film is in the range of 0.1 to 10 μm.

13. The magnetic element of claim 12, wherein the thickness of said magnetic thin film is in the range of 0.2 to 5 μm.

14. The magnetic element of claim 9, wherein a thickness of said polymer substrate is in the range of 10 to 300 μm.

15. The magnetic element of claim 14, wherein the thickness of said polymer substrate is in the range of 20 to 200 μm.

16. The magnetic element of claim 9, wherein a thickness of said coating is in the range of 1 to 30 μm.

17. The magnetic element of claim 16, wherein the thickness of said coating is in the range of 3 to 20 μm.

18. The magnetic element of claim 9, wherein a part of said magnetic thin film is disposed on the coating which is coated on the substrate and a part of said thin film is directly disposed on the substrate.

19. The magnetic element of claim 18, wherein the coating comprises a pigment or inorganic filler, a resin and a solvent.

20. The magnetic element of claim 19, wherein said resin is selected from the group consisting of cellulose, acrylic resin, polyester, urethane, starch, vinyl chloride, vinyl acetate, polyvinyl alcohol.

21. The magnetic element of claim 19, wherein said solvent is selected from the group consisting of toluene, hexane, ethyl acetate, MEK, propanol, ethylene glycol monobutylether.

22. The magnetic element of claim 19, wherein the pigment or inorganic filler is selected from the group consisting of $CaCO_3$, $BaSO_4$, $SiO_2$, $TiO_2$, Carbon, Al, iron oxide.

23. The magnetic element of claim 18, wherein the magnetic thin film disposed on the coating has a coercive force that is greater than the coercive force of the thin film directly disposed on the substrate.

24. The magnetic element of claim 9, wherein said frame-shaped pattern has an outer short side, and outer long side, an inner short side and an inner long side, the length of the outer short side is from 2 to 30 mm, the length of the outer long side is from 20 to 100 mm, the length of the inner short side is from 1 to 29 mm and the length of the inner long side is from 19 to 99 mm.

25. The magnetic element of claim 9, wherein the coating has a thickness that is greater than that of the magnetic thin film.

* * * * *